April 15, 1941. H. E. KNAUST 2,238,698
WAFFLE MACHINE
Filed Oct. 2, 1939 5 Sheets-Sheet 1

INVENTOR
HENRY E. KNAUST
BY
ATTORNEY

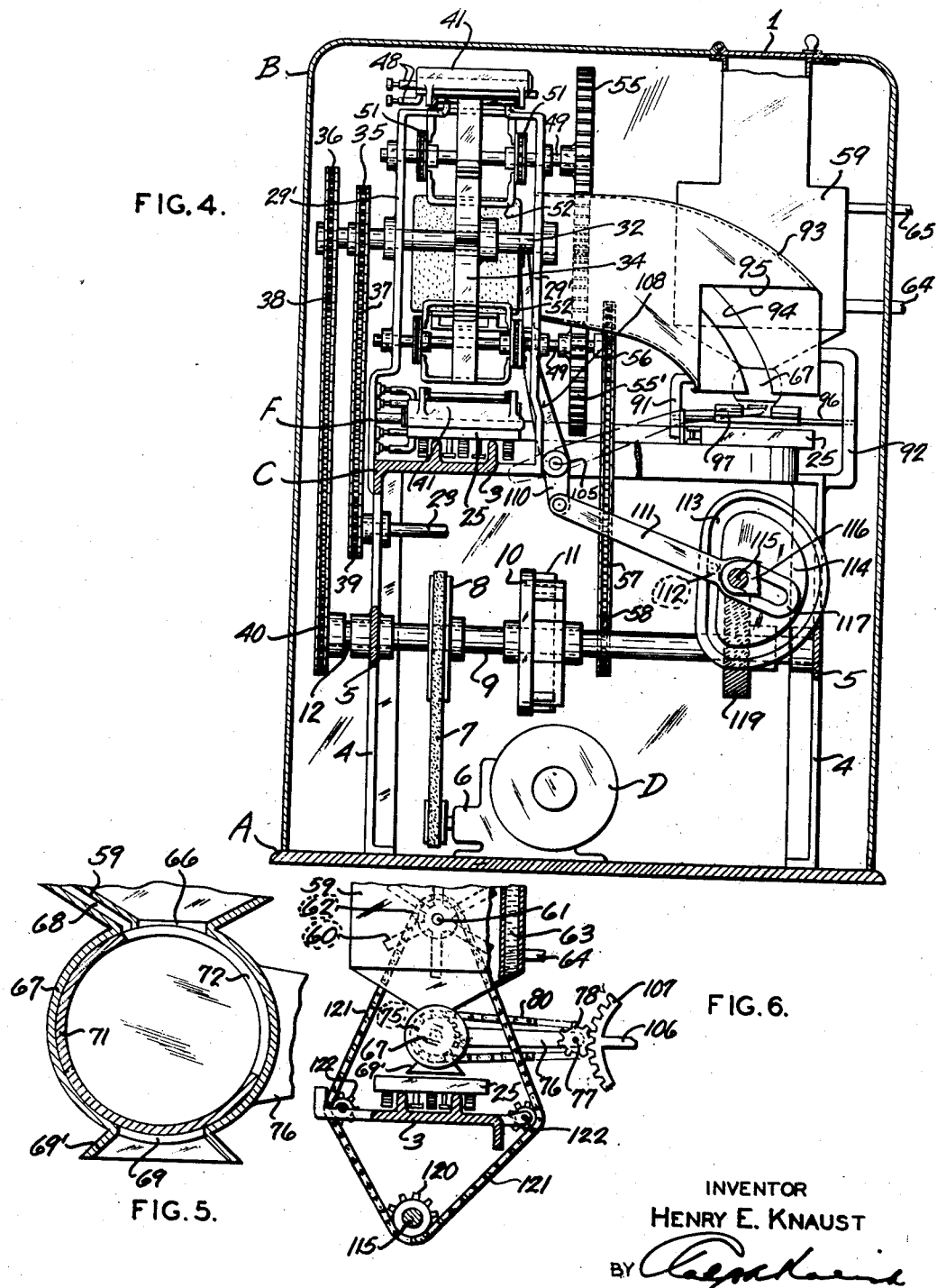

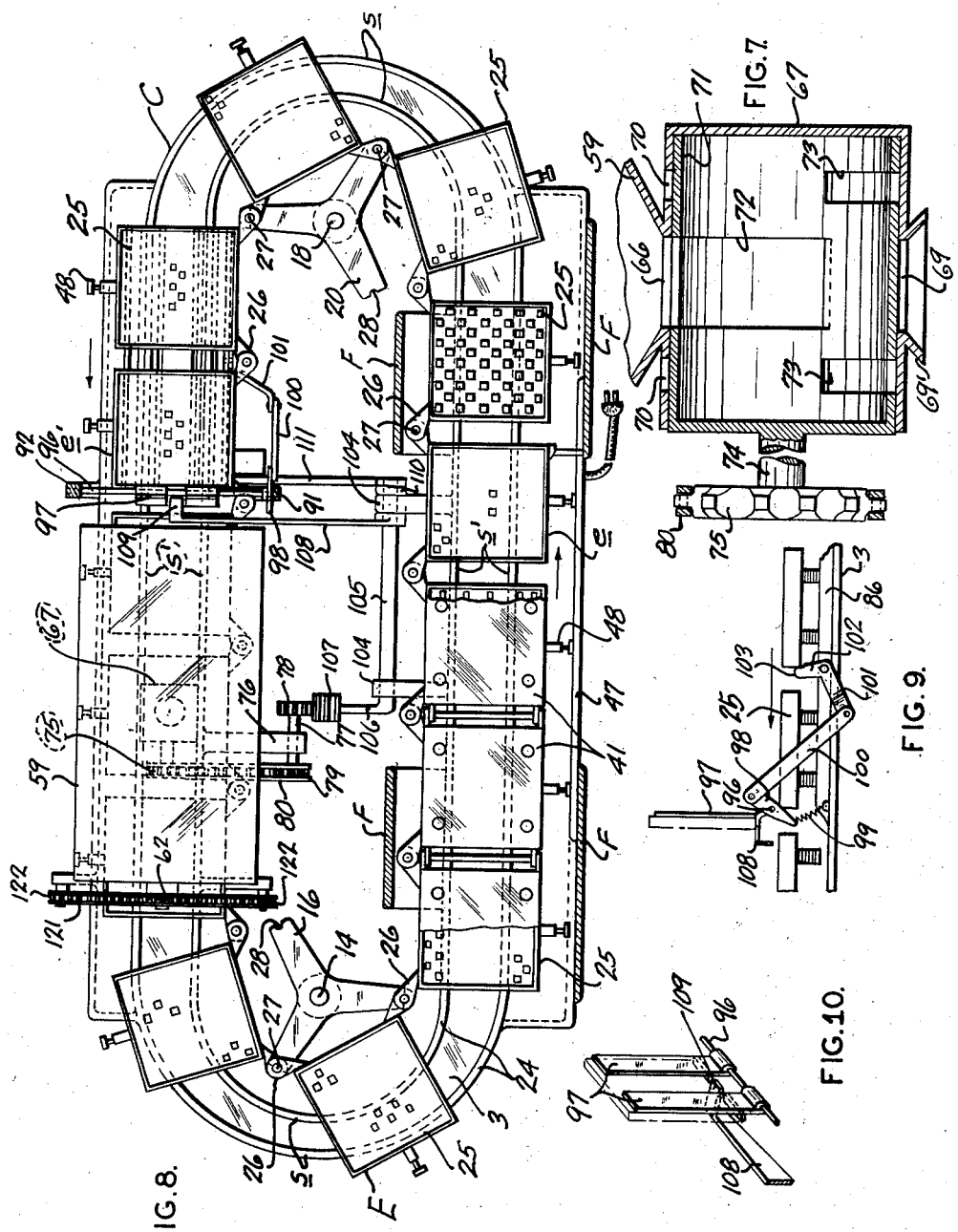

April 15, 1941.  H. E. KNAUST  2,238,698
WAFFLE MACHINE
Filed Oct. 2, 1939  5 Sheets-Sheet 5
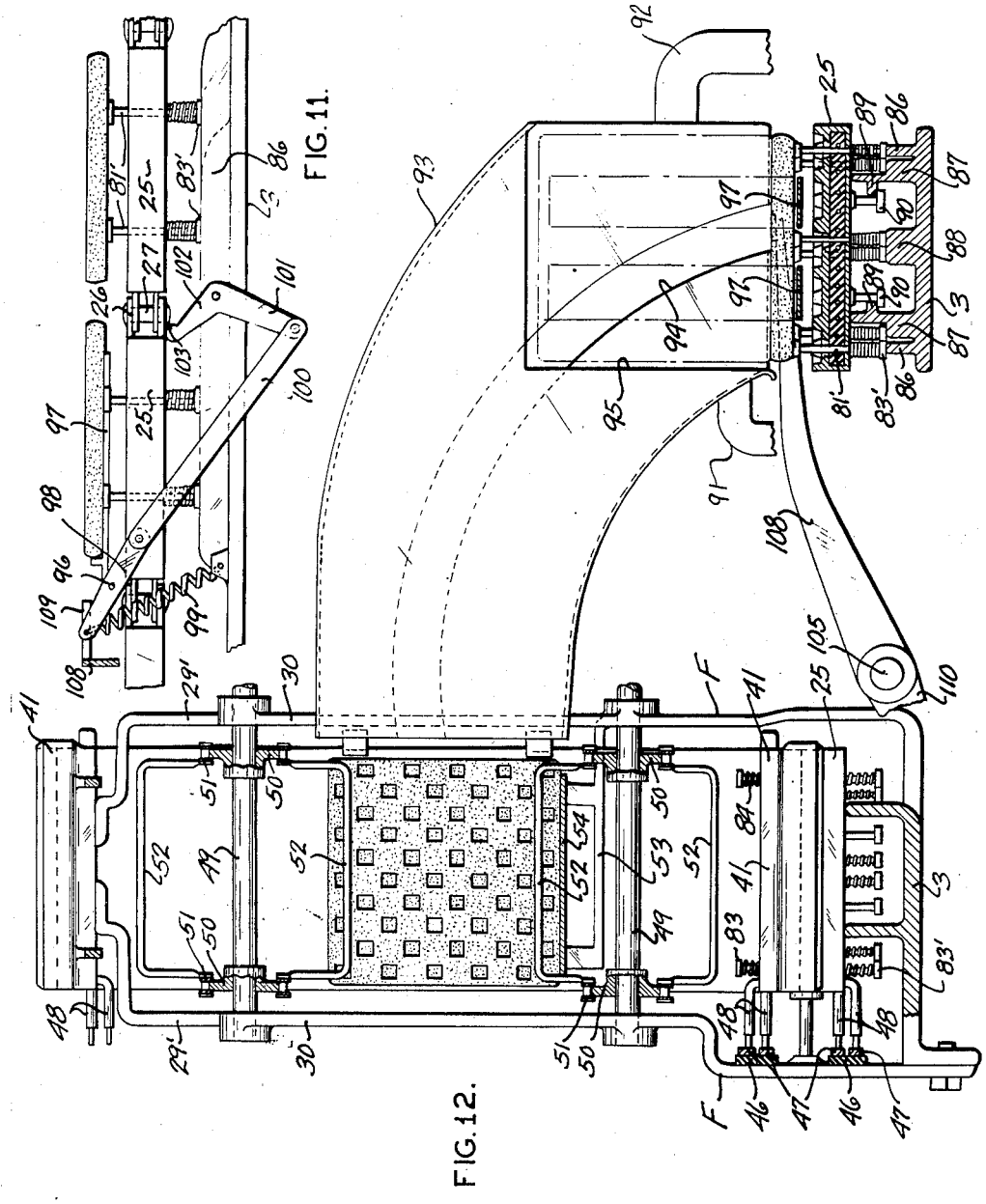
INVENTOR
HENRY E. KNAUST
BY
ATTORNEY Patented Apr. 15, 1941

2,238,698

UNITED STATES PATENT OFFICE 2,238,698

WAFFLE MACHINE

Henry E. Knaust, St. Louis, Mo., assignor to Vita Sales Corporation, St. Louis, Mo., a corporation of Missouri Application October 2, 1939, Serial No. 297,530

14 Claims. (Cl. 107—4)

This invention relates generally to baking machines and, more particularly, to a certain new and useful improvement in machines particularly adapted for the baking of waffles.

My invention hence has for its primary objects the provision of a waffle-baking machine, which may be economically constructed, which is automatic and speedy in operation, which may be continuously or intermittently operated as may be desired, which is capable not only of baking the waffles, but also of storing the baked waffles in a unique manner for retaining their freshness and crispness over a substantially long period of time, which is relatively inexpensive in operation when compared with the cost of operation of a series of individual manually operable waffle-irons of similar capacity, and which is highly satisfactory and efficient in the performance of its stated functions.

And with the above and other objects in view, my invention resides in the novel features of form, construction, arrangement, and combination of parts presently described and pointed out in the claims.

In the accompanying drawings (5 sheets)—

Figure 4 is a vertical sectional view of the machine;

Figure 1:
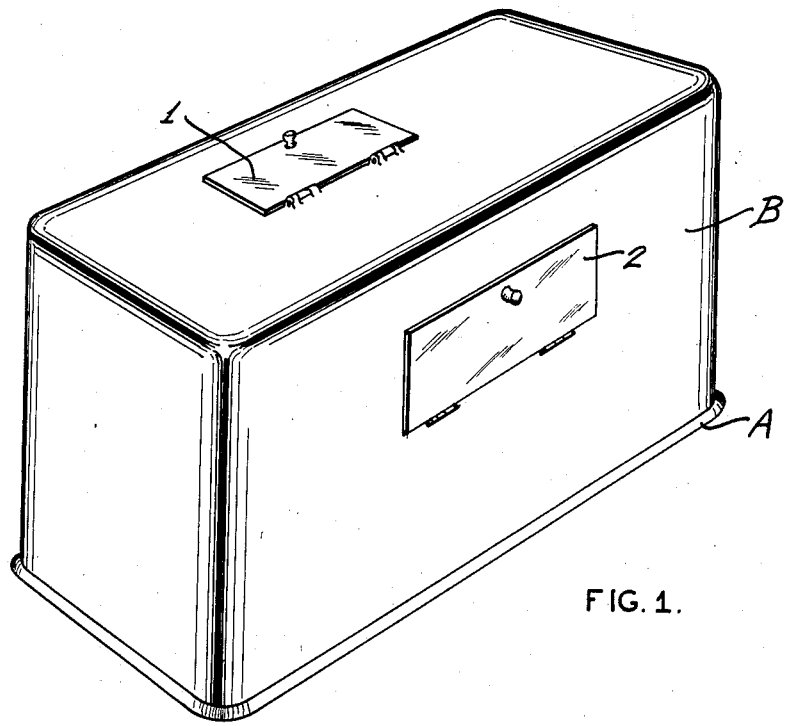
Figure 1 is a perspective view of a waffle-baking machine embodying my present invention.

Figures 5, 6, and 7 are fragmentary sectional views of the machine, illustrating in detail the construction and operation of its batter valve and tank;

Figure 8 is a fragmentary longitudinal horizontal sectional view of the machine; and Figures 9, 10, 11, and 12 are fragmentary detail views of the waffle discharge and storage mechanism of the machine.

Referring now in more detail and by reference characters to the drawings, the present waffle machine includes a base A and a hollow shell-like rectilinear housing B removably mounted on the base A and provided in its top and one side wall with preferably spring-hinged doors 1, 2, respectively.

Suitably mounted upon the base A and disposed within the housing B, is a frame C preferably integrally including a horizontally disposed top or bed 3 supported by a plurality of legs 4 upstanding from the base A and reinforced by brace or cross ribs 5.

Also mounted upon the base A, is a prime mover preferably in the form of a conventional electric motor D having preferably built therein a conventional reduction gear system 6 having driving connection by means of a belt 7 with a pulley 8 keyed or otherwise fixed upon a main drive shaft 9 journaled at its ends in, and extending transversely between, opposite brace ribs 5.

Figure 2:
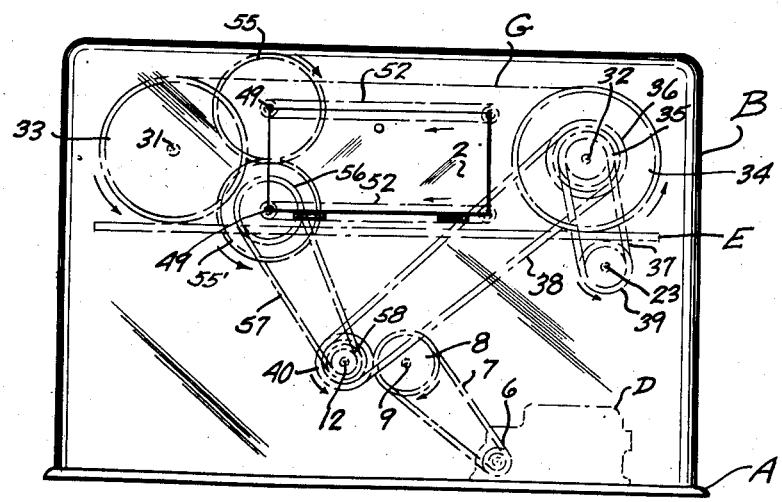
Figure 2 is a diagrammatic front elevational view of the machine, illustrating the driving connections between various of its moving parts.
Figure 3:
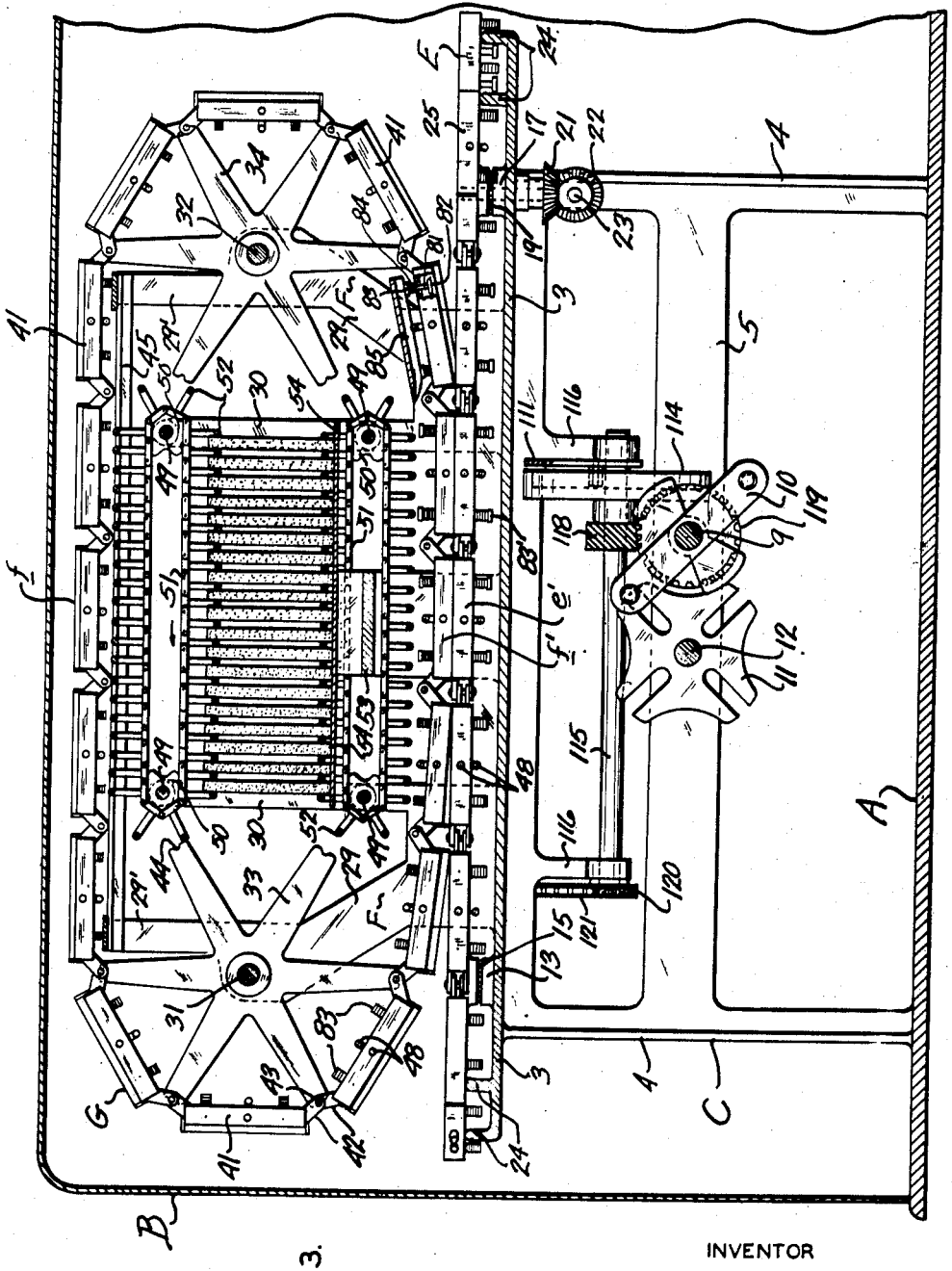
Figure 3 is a fragmentary longitudinal vertical sectional view of the machine.

Also keyed or otherwise fixed upon the shaft 9, is a Geneva-type drive gear 10 for intermittent meshing engagement with a complementary Geneva-type driven gear 11 pinned or keyed upon a shaft 12 similarly journaled at its ends in, and extending transversely between, opposed brace ribs 5, all as best seen in Figures 2 and 3.

On its upper face and adjacent one end, the frame-bed 3 is provided with a step-bearing 13 for receiving a short vertically disposed stub shaft 14, and supported on the upper end of the shaft 14 as by a conventional ball-bearing assembly 15 for rotation in a horizontal plane, is a spider 16.

Adjacent the other end of the bed 3 and aligned with the step-bearing 13, is a vertically disposed bearing 17, journaled in which is a short upstanding shaft 18 provided on its upper end with a conventional ball bearing assembly 19 for supporting a second spider 20 for rotation in the horizontal plane of the spider 16.

Upon its other or lower end, the shaft 18 is provided with a bevel gear 21 having meshing engagement with a companion bevel gear 22 pinned or keyed upon a shaft 23 journaled at its opposite ends upon, and extending horizontally between, the proximate pair of leg members 4.

Fixed upon the upper face of the bed 3, is a pair of oval-shaped concentric tracks 24, which include rounded end-sections s, respectively, concentric with the step-bearing 13 and the journal 17 and connected by straight intermediate sections s' parallel with and respectively adjacent the longitudinal margins of the bed 3, as best seen in Figures 3 and 8.

Extending around the spiders 16, 20, for travel along the tracks 24, is an endless baking conveyor E having a so-called forward run e and a rearward run e' and comprising a series of flat rectangular baking shells 25 of the so-called waffle-iron type, each shell 25 being upwardly presented, as best seen in Figure 8, and provided at its inner corners with pairs of vertically spaced angularly outwardly extending horizontal hinge links 26, the link 26 of a respective shell 25 being complementarily spaced for interfitting engagement with the companion hinge links 26 of the next succeeding shell 25 and such interfitting links 26 being pivotally connected as by means of a pintle 27 adapted for direct engagement with end tooth-recesses 28 of the spiders 16, 20, all as best seen in Figures 3 and 8 and for purposes presently fully appearing.

Rigidly fixed upon the frame B extending vertically upwardly from the bed 3 and arranged in longitudinally aligned pairs, are four similarly shaped side frame members F, each having an obliquely upwardly presented arm 29 and a vertically upwardly presented arm 30, and journaled in and extending horizontally between the respective pairs of arms 29, are shafts 31, 32, fixed on which for rotation in a vertically disposed plane approximately at right angles to the plane of rotation of the spiders 16, 20, are respective spiders 33, 34, the shaft 32 being extended at one end laterally of the machine and provided with a pair of sprockets 35, 36, respectively connected by means of drive chains 37, 38, to a sprocket 39 operatively mounted on an extended end of the shaft 23 and to a main drive sprocket 40 mounted on an extended end of the auxiliary drive shaft 12.

Trained over the spiders 33, 34, is an endless conveyor G comprising a series of upper baking shells 41 of the so-called waffle-iron type and companion to the baking shells 25, each shell 41 being provided with angularly inwardly extending pairs of spaced hinge links 42 for pivotal connection by means of pintles 43 to similar links 42 of the next succeeding and next preceding shells 41, the pintles 43 being positioned for engagement in end recesses or teeth 44 of the respective spiders 33, 34.

The spiders 33, 34, and the conveyor shells 41 are positioned and arranged in the provision of an upper horizontal run $f$ and a lower horizontal run $f'$, the upper horizontal run $f$ being supported slidably upon parallel ways or runners 45 mounted upon upwardly presented extensions 29' of the frame arms 29, and the lower horizontal run $f'$ being arranged to bring the shells 41 continuously downwardly into co-operative overlying baking relation upon the companion shells 25 along the forward run $e'$ thereof.

Secured at its ends upon, and extending horizontally between, the outer longitudinally aligned frame members F, is a contact supporting-bar 46 formed preferably of Bakelite, hard rubber, or other suitable dielectric material and provided on its inwardly presented face with four vertically spaced horizontal contactor-slides 47 conventionally connected in parallel pairs to a suitable source of electric current (not shown).

Each of the baking shells 25, 41, is provided with two laterally extending contact-shoes 48 suitably connected at their inner end to conventional electric heating coils (not shown) and positioned at their outer end for slidable contact with a contactor slide 47. It should be pointed out that the contactor slides 47 are preferably so positioned and of such length with reference to the baking conveyors E, F, that the shell heating elements will be energized only during the time that a companion pair of upper and lower shells 25, 41, are in overlying or closed baking relationship, all as best seen in Figures 4 and 8 and for purposes presently fully appearing.

Journaled at their ends in, and extending laterally of the machine between, the arms or members 30, are horizontally aligned pairs of vertically spaced shafts 49 each provided with two spaced sprockets 50, the several sprockets 50 being arranged in peripherally aligned pairs for operatively supporting vertically aligned upper and lower pairs of continuous chains 51 provided with a plurality of outwardly extending spaced parallel U-shaped racks 52 having their bights horizontally disposed. Extending horizontally beneath the upper run of the lower series of rack members 52 and suitably supported by a bracket 53 of somewhat inverted L-shape fixed upon the upper face of the frame bed 3, is a shelf or plate 54.

One of the upper and one of the lower shafts 49 project through and extend outwardly from one of the arms 30 and are provided on their respective extended ends with suitable intermeshing gears 55, 55', and the lower shaft is further provided on its extending end with a sprocket 56 connected by means of chains 57 to a drive sprocket 58, in turn, suitably fixed on the shaft 12.

Suitably suspended from the housing B and positioned beneath the hinged door 1, is a batter reservoir 59 provided with a conventional rotatory agitator 60, the shaft 61 of which is journaled in, and extends outwardly through, a side wall of the reservoir 59 and is provided on its outer end with a sprocket 62. The reservoir 59 is also provided with a water jacket 63 connected by means of inlet and outlet pipes 64 and 65 to a circulating cold water system of any conventional type (not shown). The reservoir 59 has a conically tapered bottom wall provided with an outlet, as at 66, opening into a cylindrical valve housing 67 and has an auxiliary air tube 68 opening thereinto adjacent the outlet 66. On its under side, the valve housing 67 is provided with a discharge opening 69 having a downwardly presented discharge-spout 69' positioned directly above the rearward run $e'$ of the bottom cooking shells 25. On its upper side, the valve housing 67 is provided with air-inlet openings, as at 70, all as best seen in Figures 5 and 7 and for purposes presently fully appearing.

Rotatably mounted in the valve housing 67, is a valve cylinder 71 having a segmental opening 72 positioned in vertical alignment with the valve discharge outlet 69 and the reservoir outlet 66 and also having two smaller segmental openings 73 positioned in vertical alignment with the air inlet openings 70 and spaced arcuately around the valve cylinder 71 from the opening 72, so as to be in substantially outwardly presented closed position against the valve housing 67 when the opening 72 is in upwardly presented registration with the reservoir opening 66. Conversely, when the opening 72 is in downwardly presented alignment with the discharge opening 69, the openings 73 will be in upwardly presented or open position and substantially in alignment with the air inlet openings 70.

Formed preferably integrally with, and extending axially outwardly from, the valve cylinder 71, is a stub shaft 74 provided at its outer end with a sprocket 75, and formed also preferably integrally with, and extending radially outwardly from, the valve housing 67, is an arm 76 rotatively supporting a short shaft 77, fixed on one end of which is a drive-gear 78 and on the other end of which is a sprocket 79, the latter being connected by means of a drive chain 80 to the valve-sprocket 75.

Shiftably mounted in, and extending through, each of the upper shells 41, is a plurality of short plunger rods 81 each provided at its inner end with a pusher member 82 and at its outer end with a slide shoe 83. Interposed on each plunger-rod 81 intermediate the shoe 83 and the base of the cooking shell 41, is a compression spring 84 for normally urging the plunger rod 81 outwardly and maintaining the pusher member 82 substantially flush at its outer face with the cooking face of the shell 41. The shoes 83 slidingly engage a short track 85 mounted on, and extending transversely of the machine between, the supporting legs 29, all as best seen in Figure 3 and for purposes presently fully appearing.

The bottom cooking shells 25 are similarly provided with a plurality of ejection plunger rods 81' provided with shoes 83' for slidingly engaging tracks 86, 87, 88, formed preferably integrally with, and presented upwardly from, the frame bed 3 on the discharge side of the machine, the tracks 86, 87, 88, being arranged to produce simultaneous lifting movement of the several plunger rods 81' during forward progressive movement of the cooking shells 25, all as best seen in Figures 11 and 12.

The tracks 87 upon their inner face are further provided with short narrow horizontally projecting slide tracks 89 for engagement with retention rollers 90 operatively mounted on the under face of the cooking shells 25 for holding the latter down upon the tracks 24 as the plunger rods 81' are projected upwardly.

Formed integrally with, and extending upwardly from, the frame bed 3, are supporting arms 91, 92, positioned on opposite sides of the return path of the conveyor E and suitably formed at their upper end for supporting an arcuate transfer chute 93 provided in its remote side wall with an arcuate slot 94 and in its other wall with a more or less rectangular intake opening 95, all as best seen in Figures 4 and 12 and for purposes presently fully appearing.

Journaled at its ends in the arms 91, 92, and horizontally disposed intermediate the chute 93 and the conveyor E, is a rock-shaft 96, fixed upon which is a radially outwardly presented pair of elongated flat pick-up blades or paddles 97 adapted to project just above the plane of the upper face of the cooking conveyor E when in normal horizontal position and slightly beneath the plane of the under face of the waffle when the latter has been lifted upwardly by the ejection movement of the plunger rods 81', as best seen in Figure 12.

Fixed upon, and extending radially outwardly on either side of, the rock-shaft 96, is a crank arm 98, connected to which and to the frame bed 3, is a tension spring 99 for yieldingly swinging the pick-up blades 97 upwardly into alignment with the chute-intake opening 95. Connected pivotally to the crank arm 98, is a suitably elongated link 100, in turn, pivotally connected to a bell-crank 101, one arm 102 of which is upwardly presented and provided at its upper end with a knob 103 for sliding engagement against the under side of the respective cooking shells 25, as best seen in Figure 11.

Journaled in a suitable bearing-lug 104 on the frame B, is a rock shaft 105 provided at its one end with a radially extending arm 106 carrying a segmental or arcuate rack 107 for meshing engagement with the valve drive gear 78. At its other end, the rock shaft 105 is provided with a bent delivery arm 108 having a pusher-finger 109 extending outwardly through the slot 94 into the chute 93. The arm 108 is further provided with a continuation or crank portion 110 projecting outwardly on the opposite side of the shaft 105 and pivotally connected to an actuating link 111, in turn, provided with a cam follower 112 for more or less conventional engagement in a cam track 113 of a heart-shaped cam 114 mounted on a shaft 115 journaled in suitable supports 116 depending from the bed frame 3, as best seen in Figure 3, the link 111 being further provided with a sloted extension 117 for guiding reciprocation upon the shaft 115. Fixed on the shaft 115, is a pinion 118 having meshing engagement with a worm gear 119 fixed on the main drive shaft 9.

Keyed or otherwise fixed upon the extended end of the shaft 115, is an auxiliary pinion or gear 120 drivingly connected to the agitator sprocket 62 by means of a chain 121 trained over suitable idler sprockets 122 for clearing the path of the cooking conveyor E, all as best seen in Figure 6.

It will be evident that the cooking shells 25 and 41 and the racks 52 are driven by the Geneva drive gears 10, 11, in intermittent or stepwise movement from the auxiliary drive shaft 12. The agitator 60 is continuously driven from the shaft 115, which is connected through the worm gears 118, 119, to the main drive shaft 9. The cam track 113 of the cam 114 is so designed and timed with relation to the Geneva drive 10 as to cause the carry-over arm 108 to shift from the position shown in Figure 12 to the full line position shown in Figure 4 and then back to initial position, shown both in Figure 12 and in dot-dash lines in Figure 4, during the interval when the cooking conveyors E, F, are stationary. As the carry-over arm 108 moves upwardly, the segmental rack 107 rotates the valve cylinder 71 so as to bring the cylinder-opening 72 into registration with the discharge opening 69 and the auxiliary apertures 73 into air-admitting registration with the air inlets 70, thereby permitting a measured quantity of batter to be delivered into the cooking shell 25 which has come to rest beneath the discharge spout 69'. As the arm 108 swings backwardly, the segmental rack 107 causes the valve cylinder 71 to rotate again to initial position, in which the discharge opening 69 is in alignment with the reservoir opening 66. The batter thereupon runs through the opening 66, filling the cylinder 71. Any entrained air, which may be in the cylinder 71, is forced outwardly and upwardly through the air vent or tube 68. As the valve cylinder 71 is filled, the batter may even run upwardly into the air vent tube 68 until the batter reaches the same level as the batter on the inside of the reservoir 59. Thus, a measured quantity of batter may be discharged into each respective cooking shell 25 during its location beneath the outlet 69'. As the filling operation is concluded, the stationary period of the cooking conveyors E, F, also terminates, and the cooking conveyor E is advanced one position. By progressive stages, the batter-filled cooking shells 25 are moved around and the top shells 41 brought down into overlying relationship thereupon. Thereafter, both the upper cooking shells 41 and the lower cooking shells 25 are electrically energized and heated for baking the contained batter.

Subsequently, a sufficient period of time for complete baking of the waffle having elapsed, the conveyors E, F, reach the end of their straight paths and are separated as the upper cooking shells 41 begin to move upwardly around the sprocket spider 33. At this time, the ejection plunger rods 81 ride over the track 85, thereby preventing the waffle from accidentally sticking to the upper cooking shell 41. As the lower cooking shell 25 with the baked waffles move around the arcuate end s of their path into the return run e', the ejection plungers 81' simultaneously ride up on the tracks 86, 87, 88, lifting the waffle horizontally upwardly, so that the same will slide, during the course of forward movement, freely over, and come to rest above, the pick-up blades 97.

As the baked waffle comes to rest above the pick-up blades 97, the knob 103 of the bell-crank arm 102 will slide outwardly from beneath the particular cooking shell 25 and become unlatched, as it were, thereby permitting the spring 99 to swing the pick-up blades 97 and the supported waffle upwardly into vertical position in the transfer chute 93.

During the next succeeding stationary interval of the cooking conveyor E, the carry-over arm 108 transfers the vertically held waffle through the transfer chute 93 and deposits the same gently in upright position upon the shelf 54 between vertically aligned pairs of racks 52.

During the next succeeding movement of the cooking conveyor E, the racks 52 will be shifted rearwardly by the thickness of a single baked waffle, thereby providing an empty rack space for reception of the next succeeding waffle for storage.

It should be further noted that the storage space is located directly above the area in which the cooking shells 25, 41, are being heated, so that the stored waffles remain warm. Furthermore, since the waffles are stored vertically or "on edge," so to speak, they will not lose any of their original crispness or flavor.

When desired, the hinged door 2 may be opened, exposing the storage magazine and any desired number of waffles removed. Whenever the storage magazine becomes filled, the machine may, of course, be shut down.

It will thus be evident that, by my present invention, I provide a continuous waffle-baking machine which is not only highly efficient in its operation, but also enables the production of waffles of a constant and uniform quality. By my invention, I am also enabled to store a substantial number of waffles over a fairly long period of time without in any way impairing the edibility or delectability thereof.

It should be understood that changes and modifications in the form, construction, arrangement, and combination of the several parts of the waffle-baking machine may be made and substituted for those herein shown and described without departing from the nature and principle of my invention.

Having thus described my invention, what I claim and desire to secure by Letters Patent is—

1. In a waffle machine, a plurality of movable waffle plates each provided with a plurality of waffle-ejecting plungers, stationary means for delivering in turn a measured quantity of batter to each of the waffle plates, means for heating the plates for baking the contained batter, and means engageable in turn with the plunger of each plate along a selected portion of the path of movement of the plates for ejecting the waffle.

2. In a waffle machine, a connected series of traveling batter-containers each including upper and lower matching plates having shiftable ejector plungers, means for delivering a measured quantity of batter to the containers successively, means for successively heating the containers for baking the contained batter, means for separating the plates of each container and moving them along separate paths, and means adjacent the point of separation for actuating the plungers of the upper plate for keeping the waffle in the lower plate during and after plate separation.

3. In a waffle machine, a series of traveling batter-containers each comprising upper and lower co-operable shells having ejector means operably disposed therein, means for delivering a measured quantity of batter to the containers respectively, means for electrically heating the containers during a predetermined time interval for baking the contained batter, means for separating the plates of each container and moving them along separate paths, and means adjacent the point of separation for actuating the ejector means of the upper plate for retaining the waffle in the lower plate during and after plate separation.

4. In a waffle machine, baking receptacle means, means for delivering a measured quantity of batter to the receptacle means, means for heating the receptacle means for baking the contained batter, means for removing the finished waffle after baking, and means including an open framework structure disposed directly above the receptacle means for storing the removed waffles at substantially the same temperature at which it was baked and in an atmosphere laden with the vapors arising from the baking batter.

5. A waffle machine comprising a first series of baking shells arranged for movement in a horizontal path, a second series of baking shells arranged for movement along a vertically disposed elliptical path having a lower horizontal run coincident with a portion of the horizontal path, means for delivering a predetermined quantity of unbaked dough to each member of the first series, and means for subsequently bringing a shell of the second series into cover-forming engagement with each shell of the first series.

6. A waffle machine comprising a first series of baking shells arranged for movement along a horizontal path, a second series of baking shells arranged for movement along a vertical path, a portion of which is substantially co-incident with a portion of the horizontal path of the first series for bringing the shells of the second series into container-forming overlying relationship with the shells of the first series, means for delivering a predetermined quantity of unbaked batter to each member of the first series, and means for heating the shells of both series when they are in container-forming overlying relationship for baking the contained batter.

7. A waffle machine comprising a connected train of baking shells having internal heating elements, means for moving the shells along a predetermined path, means for operatively energizing the elements during travel of the shells along a predetermined portion of said path, and waffle-storage means including a substantially open framework positioned above said portion of the path, said storage means and baking shells being substantially enclosed for preserving the freshness and warmth of the waffles by means of the humid vapors and heat arising from the shells.

8. In a waffle machine, a movable waffle-baking shell, and means for discharging the finished waffle from the shell including a plurality of plungers having heads normally forming a part of the cooking face of the baking shell, and means for shifting the plungers relatively to the shell for expelling the waffle.

9. In a waffle machine having a plurality of horizontal waffle-baking shells and waffle-storage means, transfer means for discharging the finished waffle from the shell to the storage means, means for picking up the discharged waffle and shifting it from horizontal to vertical position, means for conveying the waffle in such vertical position to the storage means, and means in the storage means for receiving and supporting a plurality of waffles edgewise and in horizontally spaced relationship.

10. In a waffle machine including a batter-container, means for heating the container for baking the contained batter, and means for removing the finished waffle after baking, storage means including a horizontal plate positioned adjacent the heating means and means for holding a plurality of waffles in laterally spaced substantially vertical position upon the plate for keeping the waffles warm during storage.

11. In a waffle machine including a batter-container, means for heating the container for baking the contained batter, and means for removing the finished waffle after baking, storage means including a horizontal plate positioned adjacent the heating means and a conveyor for supporting the waffles in spaced edgewise upright position upon, and progressing them across, the plate for keeping the waffles warm and crisp during storage.

12. A waffle machine comprising a first series of baking shells arranged for movement in a horizontal path, a second series of baking shells arranged for movement along a vertically disposed elliptical path having a lower horizontal run coincident with a portion of the horizontal path, means for delivering a predetermined quantity of unbaked dough to each member of the first series, means for subsequently bringing a shell of the second series into cover-forming engagement with each shell of the first series, and waffle storage means disposed substantially within the confines of the elliptical path.

13. In a waffle-baking machine, means for baking the waffle in horizontal position, means for elevating the waffle vertically from the waffle iron while maintaining it in horizontal position, a plurality of horizontal fingers positioned for engagement with the elevated waffle, means for rocking the fingers to swing the waffle upwardly into vertical position, a chute positioned for receiving the waffle as it reaches vertical position, means in the chute for shifting the waffle laterally through the chute, and storage means positioned adjacent the chute for receiving the waffle from the chute and holding it in vertical position.

14. In a waffle-baking machine, storage means for successively receiving a plurality of waffles and storing them on edge, said storage means comprising upper and lower pairs of horizontal conveyor chains each provided with a plurality of pairs of flight rods mounted at their ends in and extending horizontally between the chains, each of the rod pairs of the upper chains being in registration with one of the rod pairs of the lower chain and being spaced apart to loosely accommodate the waffle, a horizontal plate mounted beneath the upper run of the lower chains for slidable engagement with the lower edge of a supported waffle, and means for simultaneously driving the upper and lower chains for progressing the waffle.

HENRY E. KNAUST.